United States Patent [19]
Adelizzi

[11] 3,822,953
[45] July 9, 1974

[54] DISC RETAINER DEVICE

[75] Inventor: Richard S. Adelizzi, Newtown Square, Pa.

[73] Assignee: Westinghouse Electric Corporation, Pittsburgh, Pa.

[22] Filed: Nov. 7, 1972

[21] Appl. No.: 304,453

[52] U.S. Cl.............. 403/356, 85/8.6, 285/330, 285/381, 403/358
[51] Int. Cl........................ B60b 27/06, F16d 1/06
[58] Field of Search ...... 287/DIG. 7, 52 SH, 53 LK, 287/53 R, 52 R, 52.05; 29/447; 85/8.6; 403/273, 318, 356, 358, 355; 285/321, 330, 381

[56] References Cited
UNITED STATES PATENTS

| | | | |
|---|---|---|---|
| 2,210,811 | 8/1940 | Kelpsch | 287/53 R |
| 2,937,042 | 5/1960 | Wilder, Jr. | 287/53 LK |
| 3,164,402 | 1/1965 | Jobe | 287/52.05 |
| 3,326,580 | 6/1967 | Munier et al. | 287/53 R |
| 3,396,554 | 8/1968 | Westercamp | 287/52.05 |

*Primary Examiner*—James R. Boler
*Assistant Examiner*—Conrad L. Berman
*Attorney, Agent, or Firm*—F. J. Baehr, Jr.

[57] ABSTRACT

A turbine disc is keyed to a shaft and retained from axial movement by a circumferentially extending projection which is fixed relative to the shaft and extends into a circumferential groove in the disc, the projection being short so that the disc may be expanded by heating to slide over the projection.

4 Claims, 7 Drawing Figures

DISC RETAINER DEVICE

BACKGROUND OF THE INVENTION

This invention relates to turbine discs and more particularly to devices which prevent axial movement of a disc with respect to a shaft.

Turbine discs are bored to provide a shrink fit between the bore and the shaft and yet the disc will move with respect to the shaft during operation. Therefore, collars have been utilized on both sides of the disc to prevent axial movement. The motor fluid utilized to drive the turbine normally exerts axial force in one direction, however, under certain operating conditions axial forces are exerted in the opposite direction. While this force in the opposite direction is small relative to the force exerted by the motor fluid, this force has caused the disc to move relative to the shaft. Retaining devices disposed on both sides of the disc have been utilized successfully, however, such retaining devices are expensive to manufacture and install.

SUMMARY OF THE INVENTION

In general, a rotatable shaft and a disc having a bore cooperatively associated with the shaft, when made in accordance with this invention, are subjected to torque and thrust loading when they are being rotated and they have registering keyways in the shaft and disc, a key cooperatively associated with the keyways for transmitting torque between the shaft and the disc, a circumferentially extending groove in the disc, a circumferentially extending dog which registers and extends radially into the groove. The dog is cooperatively associated with the shaft in such a manner as to be axially fixed relative to the shaft thereby preventing relative axial movement between the shaft and the disc.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
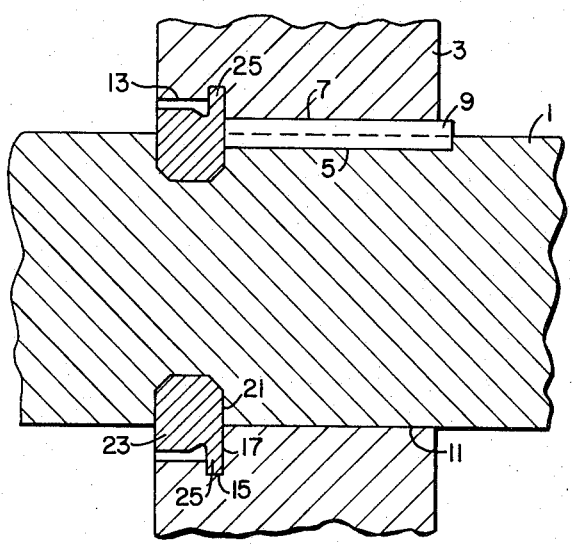
FIG. 1 is a partial sectional view of a disc and shaft, wherein the disc is held in position by a disc retainer made in accordance with this invention.

Referring now to the drawings in detail, FIG. 1 shows a rotatable shaft 1 and a disc 3 cooperatively associated therewith. The disc 1 and shaft 3 form a portion of a rotating machine such as a steam turbine. The shaft 1 and disc 3 are subjected to torque and axial thrust loading as they are rotated. The thrust loading in one direction from right to left as shown in FIG. 1 is substantially greater than the thrust loading in the other direction from left to right as shown in FIG. 1. Registering keyways 5 and 7 are disposed, respectively, in the shaft 1 and disc 3 and a key 9 is cooperatively associated therewith for transmitting torque between the disc 3 and the shaft 1.

Figure 2:
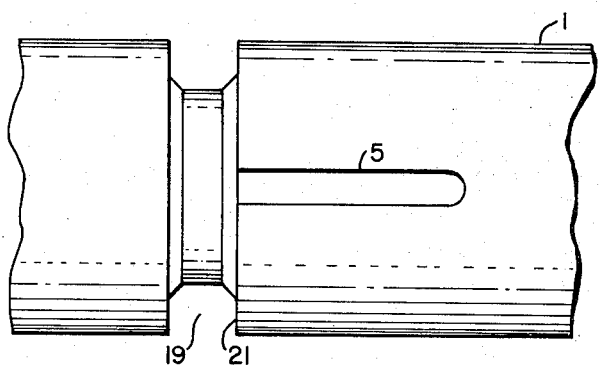
FIG. 2 is a partial elevational view of the shaft.

The disc 3 has a bore 11 which is adapted to provide a shrink fit on the shaft 1. One end of the bore 11 is counterbored and designated by the reference numeral 13. A circumferential groove 15 is disposed inboard of the counterbore 13 and has a wall 17 adjacent the bore. As shown in FIG. 2, a girthwise groove 19 is disposed in the shaft and one wall 21 thereof is disposed to align with the wall 17 of the circumferential groove 15.

A split ring 23 having two or more arcuate segments is disposed within the girthwise groove 19 and extends radially outwardly beyond the peripheral surface of the shaft 1. Each arcuate segment of the ring 23 has a circumferentially extending radial projection or dog 25 which extends into the circumferential groove 15.

The ring 23 is thus disposed to resist the major axial or thrust loading in one direction, from right to left as shown in FIG. 1, and the radial projection 25 is disposed to resist the minor axial or thrust loading in the other direction, from left to right as shown in FIG. 1. The height of the radial projection 25 is short so that the disc 3 may be assembled by heating the disc and sliding the counterbore 13 over the projection 25 and as the disc 3 cools it becomes locked in place as the projection 25 enters the circumferential groove 15.

Figure 3:
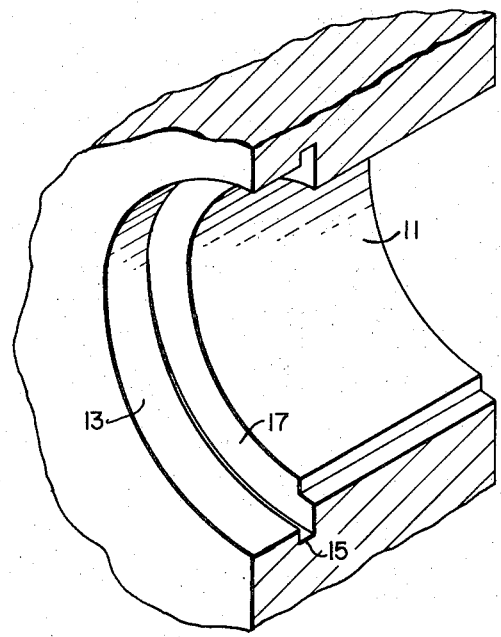
FIG. 3 is a partial perspective view of the disc.

As shown in FIGS. 2 and 3 the keyway 5 in the shaft 1 extends into the girthwise groove 19 and the keyway 7 in the disc 3 extends all the way through the disc.

FIGS. 4 through 7 show another embodiment of the disc retainer in which a rotatable shaft 1' and disc 3' are cooperatively associated. The shaft 1' and disc 3' are also subjected to torque and axial thrust loading as they are rotated. Registering keyways 5' and 7' are disposed respectively in the shaft 1' and disc 3' and a key 9' is cooperatively associated therewith for transmitting torque between the discs 3' and the shaft 1'.

The disc 3' has a bore 11' which is adapted to provide a shrink fit on the shaft 1'.

The key 9' is a fitted key, that is, it is shaped to fit tightly into the keyway 5' in the shaft 1', and it is not movable in an axial direction.

Figure 7:
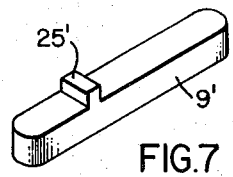
FIG. 7 is a perspective view of a key utilized in the alternative disc retaining device.

As shown in FIG. 7 the key 9' has a rectangular cross section and rounded ends and a circumferentially extending projection or dog 25' extends from the upper surface thereof.

Figure 4:
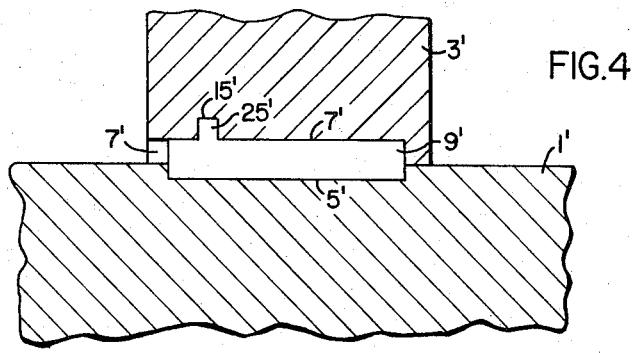
FIG. 4 is a partial sectional view of an alternative disc retaining device.
Figure 5:
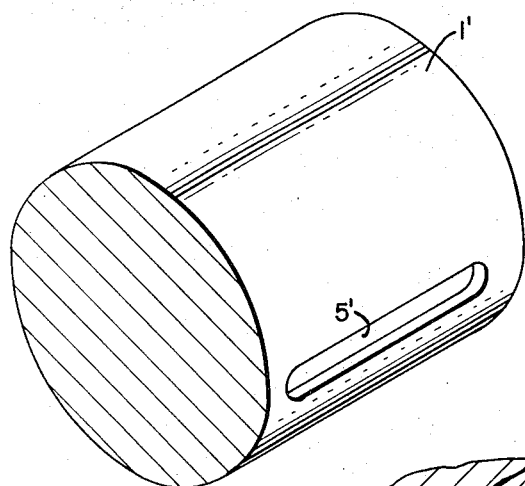
FIG. 5 is a partial perspective view of the shaft utilized in the alternative retaining device.
Figure 6:
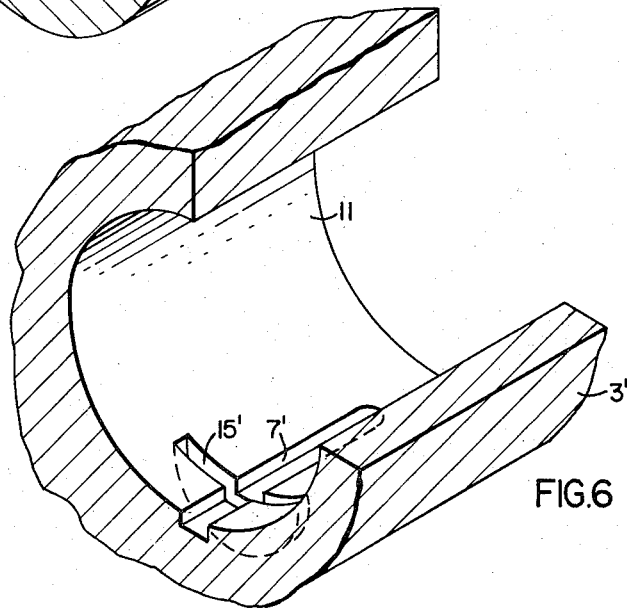
FIG. 6 is a partial perspective view of the disc utilized in the alternative retaining device.

As shown in FIG. 6 the keyway 7' is disposed in the bore 11' and extends only partially through the disc 3', so as to engage one of the rounded ends of the key 9' when assembled. Thus, the key 9' and keyways 5' and 7' cooperate to prevent axial movement of the disc with respect to the shaft in one direction, from right to left as shown in FIG. 4, to resist the major thrust or axial loading.

A circumferentially extending groove 15' is disposed in the bore 11' and traverses the keyway 9'. The groove 15' may be made with a Woodruff key cutter or other means. The groove 15' is disposed to register with the projection 25' on the key 9' so that when the unit is assembled the projection or dog 25' will extend into the groove and prevent axial movement of the disc with respect to the shaft in the opposite direction, from left to right as shown in FIG. 4, and thus resist the minor thrust or axial loading on the disc.

The disc retaining devices hereinbefore described advantageously transmit torque between the disc and the shaft and prevent axial movement in either direction and are inexpensive to manufacture and install.

What is claimed is:

1. In combination, a rotatable shaft, a disc having a bore receiving said shaft, said shaft and disc being subjected to torque and thrust loading when they are being rotated, registering keyways in said shaft and said disc, a key fitting into said keyways for transmitting torque between said shaft and said disc, a circumferentially extending groove in said disc, a circumferentially extending dog registering with and extending radially into said circumferential groove, a girthwise groove disposed in said shaft, a counterbore disposed in said disc registering with said girthwise groove in said shaft, said circumferential groove in said disc being disposed inboard of said counterbore, and an arcuate segment of a ring being disposed within said girthwise groove and extending beyond an outer periphery of said shaft into said counterbore preventing axial movement of said disc with respect to said shaft in the direction of said girthwise groove, said arcuate segment having said dog disposed thereon, and being disposed in such a manner that when said dog extends into said circumferential groove, said dog prevents axial movement of said disc with respect to said shaft in the direction away from said girthwise groove thereby preventing all axial movement of said disc relative to said shaft.

2. The combination as set forth in claim 1, wherein the girthwise groove extends completely around the shaft.

3. The combination as set forth in claim 2, wherein said ring comprises a plurality of arcuate segments which are generally disposed circumferentially around the shaft.

4. The combination as set forth in claim 2, wherein said ring comprises two arcuate segments, each being generally semicircular.

* * * * *